United States Patent [19]

Rijkeboer

[11] Patent Number: 5,279,645
[45] Date of Patent: Jan. 18, 1994

[54] BAUXITE PROCESSING

[75] Inventor: Albert Rijkeboer, AT Arnhem, Netherlands

[73] Assignee: Shell Research Limited, London, United Kingdom

[21] Appl. No.: 910,057

[22] Filed: Jul. 8, 1992

[30] Foreign Application Priority Data

Jul. 10, 1991 [GB] United Kingdom ............... 9114870

[51] Int. Cl.$^5$ .............................................. C22B 1/02
[52] U.S. Cl. ........................................ 75/746; 75/671; 75/673
[58] Field of Search ........................... 75/746, 671, 673

[56] References Cited

U.S. PATENT DOCUMENTS 2,805,929  9/1957  Udy ..................................... 75/10.53
4,411,695  10/1983  Twyman .............................. 75/671
4,654,088  3/1987  Fitzpatrick .......................... 75/671

FOREIGN PATENT DOCUMENTS 0375987  7/1990  European Pat. Off. .
48039317-A  9/1971  Japan .
1383136  2/1975  United Kingdom .

*Primary Examiner*—Peter D. Rosenberg

[57] ABSTRACT

An improved process for the removal of organic matter from bauxite ore containing gibbsite comprises heating the ore under roasting conditions including a roasting temperature of from about 400° C. to about 600° C. with oxygen-containing roasting gas having a moisture content of less than 1% by volume water until the water of crystallization of the alumina present in the treated product is less than 0.5 mole per mole of alumina.

11 Claims, No Drawings

BAUXITE PROCESSING

FIELD OF THE INVENTION

The present invention relates to an improved method for the processing of bauxite ores. More particularly, the invention relates to the removal of organic matter from bauxite prior to the further processing of the resulting aluminum-containing material by the Bayer process.

BACKGROUND OF THE INVENTION

Aluminum is conventionally produced commercially by the electrolytic conversion of alumina. The alumina is produced by well known procedures from aluminum hydroxide which is typically obtained by treating an aluminum-containing ore according to the Bayer process.

In the Bayer process, well known and conventional, an aluminum containing ore such as bauxite is digested with an aqueous alkali solution, usually an aqueous solution of sodium hydroxide, at elevated temperature to extract the alumina present. The resulting slurry contains soluble alkali aluminates and various materials insoluble in the alkaline solution. The slurry is then cooled, often by flash cooling and then filtered (clarified) to remove the insoluble solids. The supernatant alkali aluminate solution is then further cooled and seeded with aluminum hydroxide crystals to precipitate aluminum hydroxide. The precipitate is separated, washed, dried and then calcined at elevated temperature to produce the desired alumina. The alkali aluminate liquor of reduced aluminum content is recycled to the bauxite digestion step after removal of any excess accumulated water and provision of necessary make-up sodium hydroxide.

The alumina in most aluminum-containing ores is in the form of an alumina hydrate. In ores termed "bauxite", the alumina is generally present as a trihydrate, i.e., $Al_2O_3.3H_2O$ or $Al(OH)_3$, or as a monohydrate, i.e., $Al_2O_3.H_2O$ or $AlO(OH)$. The trihydrate, termed "gibbsite", dissolves or digests more readily in the aqueous alkali solution than the monohydrate, termed "boehmite". Thus, bauxite ores containing major proportions of gibbsite digest at lower temperatures and pressures than do bauxite ores containing major proportions of boehmite.

In addition to the alumina hydrates, bauxite ores contain lesser amounts of silica (quartz), clay minerals such as kaolinite, iron oxides such as geothite or haematite, metal sulfides and organic matter including cellulose and humus. Depending upon the particular ore and the geological history of the site from which the ore was obtained, the type and proportion of these impurities will vary. Of particular concern is the proportion of organic matter present. A substantial part of the organic matter, e.g., up to 50% by weight or more, dissolves in the aqueous alkali aluminate solution during digestion. The presence of this soluble organic matter causes difficulties in the clarification and precipitation steps. The presence of the soluble organics lead to decreased efficiency in the aluminum hydroxide precipitation and certain types of organic matter form viscous liquors which reduce pumping and settling efficiency. Moreover, digestion of the organic matter consumes alkali which would otherwise be recycled.

It is known that these difficulties can be reduced if part or all of the organic matter is removed from the bauxite prior to the digestion step of the Bayer process. One known method of reducing the organic matter content of the bauxite is to calcine the ore prior to digestion. Considerable care must be taken during any type of heating bauxite ores to minimize the decomposition of any gibbsite present in the ore to boehmite. Such decomposition would decrease the efficiency of the subsequent digestion step.

In British Patent 1,383,136, a process is disclosed which involves calcination of gibbsitic bauxite containing ferric oxide. Substantial measures must be taken to prepare the ore in very small particles, for example, particles of a 10 $\mu$m size, and the water content must be carefully controlled. The overall process is efficient, in part because of the presence of 10% by weight to 25% by weight of ferric oxide which helps prevent the transition of gibbsite to boehmite. However, the process is difficult because of the small size of the bauxite particles. In addition, the particular process conditions do not preclude decreased extractability of the resulting calcined bauxite. In European Patent Application No. 375987 there is described a process of calcining gibbsite bauxite wherein about 70% by weight of the organic matter, particularly oxalates, is removed. This process also uses rather small particles on the order of 63 $\mu$m, and has the further disadvantage of rather incomplete removal of organic matter. The resulting calcined bauxite still contains about 0.1% by weight of organic carbon. It would be of advantage to have an improved process for the calcination of bauxite wherein the efficiency of alumina extraction is not reduced and a higher proportion of the organic matter is removed.

SUMMARY OF THE INVENTION

The present invention provides an improved method for the removal of organic matter from bauxite ore. More particularly, the present invention provides an improved process for the calcination of bauxite ore prior to the extraction therefrom of alumina. The process comprises the heating of bauxite particles under roasting conditions with a roasting gas of limited water content to reduce the amount of water associated with the alumina component of the resulting materials to less than 0.5 mole per mold of alumina. The product of the roasting has a decreased content of organic matter and the alumina present is substantially in a form which is easily extractable when treated with aqueous alkali solution.

DESCRIPTION OF THE INVENTION

The process of the invention is directed to the removal of organic matter from a bauxite ore containing alumina under conditions whereby the conversion of the hydrated alumina of the ore to materials less extractable than gibbsite is minimized. The conditions comprise the heating or roasting of the bauxite of specified particle size under roasting conditions with a roasting gas of low water content.

The bauxite ore to which the present process is applied is preferably provided in particulate form. The precise particle size of the bauxite is of some importance insofar as the particle size will influence the roasting temperature and the control of the roasting gas. In general, satisfactory results are obtained if the bauxite particle size is less than 8 mm but more than about 0.5 mm. The preferred particle size is from about 2 mm to about 4 mm.

The roasting gas is provided to the bauxite particles to remove organic matter present by a process of oxidation and to control the water content of the bauxite, particularly the water associated with the alumina as water of crystallization (alternatively termed water of hydration). The roasting gas suitably contains more than 0.1% by volume of oxygen based on the total of an otherwise inert roasting gas. Better results are obtained with a higher oxygen content and in part for convenience the use of air is preferred. In other modifications, however, the use of oxygen-rich mixtures with nitrogen, argon or other inert gas is also satisfactory. The roasting gas has a very low water content and is preferably substantially free from water vapor. Roasting gases containing less than 1% by volume of water vapor based on total roasting gas are useful but the roasting gas preferably contains no more than about 0.1% by volume of water vapor on the same basis. Expressed differently, the roasting gas has a water vapor pressure below about 2 kPa.

The bauxite particles are treated with the roasting gas at an elevated temperature under conditions whereby substantially all of the bauxite particles are contacted with roasting gas. The temperature of the roasting zone is suitably from about 400° C. to about 600° C. with the temperature range from about 420° C. to about 580° C. being preferred and the temperature range from about 450° C. to about 520° C. being particularly preferred. In an embodiment of the roasting process found particularly suitable, the bauxite particles are preheated by contact with roasting gas in a first roasting zone where the temperature is above about 250° C. below about 380° C., preferably from about 300° C. to about 350° C. The particles are then passed to a second zone for heating at the higher temperatures specified above.

The bauxite particles may be directly heated in the roasting zone but better results are obtained if the roasting gas is heated, as by combustion of carbonaceous fuel, to a temperature at or above the desired roasting temperature and the bauxite particles are heated to roasting temperature by passage of the heated gas through the particles while the particles are maintained in the roasting zone. The intimate contacting of the roasting gas and the bauxite particles to ensure that substantially all the particles are contacted with roasting gas is facilitated by some means of agitation of the particles. Suitable contacting is achieved through the use of a fluidized bed of bauxite particles or through the use of a rotary kiln. Such agitation means and the use thereof are broadly conventional. The contacting of roasting gas and bauxite particles is also influenced by the flow rate of the roasting gas through the roasting zone. The flow rate is suitably at least about 0.1 m/sec but less than about 10 m/sec. Preferred flow rates are from about 3 m/sec to about 5 m/sec. Such flow rates serve in part to avoid heating the bauxite particles at too high a rate. The average temperature gradient for the heating of the bauxite particles should be no more than about 15° C./min, and preferably from about 4° C./min to about 12° C./min.

The roasting process is suitably conducted in a batch or in a continuous manner provided that unduly long residence times are not employed. The residence time of the bauxite particles in the roasting zone is influenced by the roasting temperature utilized and the size and composition of the bauxite. Typically, a residence time from about 3 minutes to about 60 minutes are suitable when bauxite particles of average size are roasted. Particularly useful results are obtained when residence times from about 10 minutes to about 20 minutes are used. Such residence times are sufficient to reduce the water associated with the alumina of the roasted product to no more than 0.5 mols of water per mol of alumina.

It is useful, on occasion, to subject the bauxite particles prior to the roasting to a drying step to remove any free water present in the bauxite. In such a drying step, the bauxite particles are heated to a temperature from about 100° C. to about 150° C. This drying takes place in the same zone as that used for the roasting or in a separate drying zone. The drying temperature is the result of an external heat source or alternatively through the use of heated gas passing from the roasting zone. The provision of the drying media to the bauxite in the form of gas countercurrently passing from the roasting zone is preferred in part because of the energy utilization benefits. However, gas passing from the drying zone is not suitable for recycle to the roasting zone without reduction of the moisture content introduced during drying.

Substantial benefits accrue through the use of the present process which are not available from the conventional processes. Initially, a higher proportion, e.g., 90% by weight or even higher, of the organic matter present in the bauxite is removed. The presence of any such content of organic matter does not unduly interfere with the efficient digestion of the bauxite as do higher contents. Moreover, the process which invariably leads to some decomposition of the hydrated alumina present in the bauxite provides decomposition products which are at least as easily extracted by aqueous alkali solution as gibbsite. Under the conditions of the process, whereby the water associated with the alumina of the roasted product is less than 0.5 mole of water per mole of alumina, at least the major proportion of any boehmite-type material that is formed is further decomposed to products such as chi-alumina which is extracted with aqueous alkali as easily as gibbsite. Thus, the process of the invention efficiently removes the organic matter from a bauxite ore without rendering less efficient the aqueous alkali extraction or further processing of a Bayer process conventionally associated therewith.

The invention is further illustrated by the following Illustrative Embodiment which should not be regarded as limiting.

ILLUSTRATIVE EMBODIMENT

A sample of bauxite is digested with aqueous sodium hydroxide under standard conditions after treatment with heated air according to the invention. The extractables before treatment ($E_n$) and after treatment ($E_t$) were measured as was the temperature at the start ($T_s$) and the finish ($T_f$) of the heated air treatment. The molar ratio of water bound to the alumina ($n_r$), the loss of ignition value (L) and the reduction of total organic content (TOC red.) were also measured. These determinations were made for a series of tests in which the water partial pressure ($P_{H2O}$) of the air used was varied.

The bauxite investigated was from the Darling Range, Mount Saddleback, Australia. The bauxite particles had grain size between 1.6 mm and 3.5 mm. The heat treatment was conducted in a fixed bed of bauxite wherein air at standard temperature and pressure (STP) was supplied at a superficial flow velocity of 4 m/min and the temperature gradient was 8° C./min. The results are shown in the Table.

TABLE

| $P_{H2O}$ kPa | $T_s$, °C. | $T_f$, % C. | $n_r$ | L, % wt | $E_n$, % wt | $E_t$, % wt | TOC red, % wt |
|---|---|---|---|---|---|---|---|
| 0 | — | — | 0.46 | 18.6 | 97 | 99 | 97 |
| 5 | 110 | 350 | 0.33 | 19.2 | 97 | 98 | 97 |
| 5 | 350 | 515 | 0.26 | 19.6 | 97 | 95 | 97 |
| 5 | 110 | 515 | 0.27 | 19.6 | 97 | 95 | 97 |

What is claimed is:

1. A process for the removal of organic matter from bauxite ore by contacting the bauxite of particle size no more than 8 mm for from about 3 minutes to about 60 minutes with oxygen-containing roasting gas at a temperature from about 400° C. to about 600° C. in a roasting zone, the roasting gas having a water vapor content of less than 1% by volume based on total gas until the water of crystallization of the alumina present in the resulting product is less than 0.5 mole of water per mole of alumina.

2. The process of claim 1 wherein the particle size of the bauxite is from about 2 mm to about 4 mm.

3. The process of claim 2 wherein the roasting gas contains more than 0.1% by volume oxygen based on total roasting gas.

4. The process of claim 2 wherein the roasting gas is air.

5. The process of claim 4 wherein the bauxite particles, prior to roasting, are preheated to a temperature above about 250° C. but below about 380° C.

6. The process of claim 5 wherein the roasting temperature is from about 450° C. to about 520° C.

7. The process of claim 6 wherein the roasting gas has no more than about 0.1% by volume of water vapor based on total roasting gas.

8. In the process for extracting alumina from particulate bauxite with aqueous alkali and precipitating aluminum hydroxide from the resulting alkali aluminate solution, the improvement of removing organic matter from the bauxite prior to extraction by contacting the bauxite with an oxygen-containing roasting gas having a water vapor pressure below 2 kPa, at a temperature from about 400° C. to about 600° C., until the water associated with the alumina of the roasted product is less than 0.5 mole per mole of alumina.

9. The process of claim 8 wherein the oxygen-containing roasting gas contains more than 0.1% by volume based on total gas.

10. The process of claim 9 wherein the roasting temperature is from about 450° C. to about 520° C.

11. The process of claim 10 wherein the roasting gas is air.

* * * * *